United States Patent
Sapir

(10) Patent No.: US 6,912,862 B2
(45) Date of Patent: Jul. 5, 2005

(54) CRYOPUMP PISTON POSITION TRACKING

(75) Inventor: Itzhak Sapir, Irvine, CA (US)

(73) Assignee: Irvine Sensors Corp., Costa Mesa, CA (US)

( * ) Notice: Subject to any disclaimer, the term of this patent is extended or adjusted under 35 U.S.C. 154(b) by 6 days.

(21) Appl. No.: 10/615,641

(22) Filed: Jul. 8, 2003

(65) Prior Publication Data

US 2004/0007004 A1 Jan. 15, 2004

Related U.S. Application Data

(60) Provisional application No. 60/394,167, filed on Jul. 8, 2002.

(51) Int. Cl.[7] .............................. F25B 1/00; F25B 49/00
(52) U.S. Cl. ........................ 62/228.1; 62/50.6; 62/226; 417/18
(58) Field of Search .......................... 62/6, 226, 228.1, 62/50.6; 417/18

(56) References Cited

U.S. PATENT DOCUMENTS

| | | | | | |
|---|---|---|---|---|---|
| 4,543,793 | A | * | 10/1985 | Chellis et al. | 62/6 |
| 5,924,975 | A | * | 7/1999 | Goldowsky | 600/16 |
| 6,205,791 | B1 | * | 3/2001 | Smith, Jr. | 62/6 |
| 6,640,556 | B2 | * | 11/2003 | Ursan et al. | 62/50.6 |

* cited by examiner

*Primary Examiner*—Marc Norman
(74) *Attorney, Agent, or Firm*—W. Eric Boyd, Esq.

(57) ABSTRACT

An improved cryogenic compressor with piston position sensing is disclosed. Precision optical encoders using incremental or absolute encoding are incorporated into a compressor to allow for accurate position sensing of moving elements within the compressor. Appropriate electronic circuitry is used to interpret the position data to allow the user modify the frequency and stroke of the piston within the compressor. The invention may be used in systems with multiple compressor pistons or for position data for balance weights or displacers in a cryogenic refrigeration system.

4 Claims, 3 Drawing Sheets

CRYOPUMP PISTON POSITION TRACKING

REFERENCE TO RELATED APPLICATIONS

This application is related to U.S. Provisional Patent Application Ser. No. 60/394,167, filed Jul. 8, 2002, to which the present application claims priority under 35 U.S.C. 119 and which is incorporated herein by reference.

STATEMENT REGARDING FEDERALLY SPONSORED RESEARCH OR DEVELOPMENT

Not applicable

BACKGROUND OF THE INVENTION

1. Field of the Invention

The present invention relates to real-time position sensing of a moving part within a cryogenic refrigeration system. More specifically, the present invention relates to the use of position sensing of moving parts in a cryogenic compressor or cryogenic refrigeration system using precision sensors and support circuitry capable of accurately determining the location of a moving part.

2. Description of the Background Art

Cryogenic refrigeration systems or "cryocoolers," are becoming increasingly commonplace and are used in a variety of applications where very cold temperatures are necessary or desired. These applications include cooling of sensor electronics or optics in military and commercial equipment used in satellites and space flight, superconducting electronics and in research and development.

Typical cryogenic refrigeration systems have an ability cool from 70–80K in a single stage system and in the range of 2.3K in advanced, multistage systems. Closed system cryogenic refrigeration systems include the Stirling, Gifford-McMahon J-T and pulse tube head types which cool by alternating the compression and expansion of a working fluid, commonly, helium. The Stirling and Gifford-McMahon systems incorporate a mechanical, reciprocating displacer to move the helium to the system regenerator and to remove heat and return the gas to a system compressor. The high-pressure helium is expanded in the displacer module connected to a regenerator and cold head. The pulse tube system does not include a mechanical displacer but rather cyclically compresses and expands the helium as it moves through the heat exchanger by use of a rotary valve to generate an oscillating compression-expansion cycle.

Common to each of the Stirling, Gifford/McMahon, J-T and pulse tube systems is a compressor assembly in which the expanded helium or other working fluid that is returned from the system is compressed by use of a piston. The compressor assembly includes one or more pistons in a compression volume or cylinder for the compression of the returned helium. These cryogenic refrigeration systems commonly use a linearly oscillating piston driven by an electric "voice coil" motors where the piston assembly is supported by a flexure bearing. The piston oscillation is typically controlled by an active position control servo operating on position sensor feedback. It has been determined that active position control improves thermodynamic efficiency of the unit, helps reduce vibration, and prevents a piston from impacting end stops during operation. It has also been determined that control of fluid flow and movement of the expansion chamber (displacer) must be continuously and accurately timed.

In order to have better control over the temperature of a cold head in a cryocooler system, there is a need to receive continuous indication of the cryopump piston, the position of the piston in a displacer as well as the position of balancing weights in vibration dampened systems.

Optical Encoder Technology

Current position control designs for moving components in a cryocooler system use linear variable differential transformers (LVDT) as position sensors. This method works well, but the special design and low volume production associated with incorporating an LVDT into an existing cryocooler system is expensive and results in lengthy design delays. Further, new cryocooler designs require a new or redesigned LVDT systems to allow the pistons to operate over a variable stroke range or to fit a different space allocation. This undesirably lengthens the design cycle and results in relatively high non-recurring engineering costs. Accordingly, there exists a need for a less expensive, precision position sensor system that can readily be adapted to existing cryocoolers or to future cryocooler designs.

Optical encoder technology is well developed, well known and widely used in other applications. Encoder components are low-cost, off-the-shelf items with the exception of the user-specified, printed pattern on the encoder's index plate. This pattern is usually made per user specification and there are many vendors for such devices with proven and cost effective practices.

An optically encoded position sensor of the type described herein simplifies manufacturing and reduces cost relative to LVDT technology for a number of reasons. Existing encoder units use several readily available, commercial off-the-shelf or easily manufactured components, are easy to install and align in a cryocooler, are compact, lightweight, and are highly reliable. These elements lend themselves to low-cost production and incorporation into existing cryocooler technology.

As is well known in the art, optical encoders are devices that have two major sub assemblies. One subassembly is an index plate, which is connected to a moving component, is a system requiring position detection. The index plate is connected to and moves with the specified component. The index plate generally comprises a transparent plate with one or more longitudinal sections with different markings on each of them. The second subassembly, referred to herein as an emitter/detector or transmit/receive unit, is mounted on a stationary member on or within the compressor housing and typically consists of a light source (LED or another) and a light detector. When the encoder is assembled into the compressor, the light source and detector are positioned in a way that there is a gap between them whereby the detector picks up the light from the light source. The index plate occupies this gap (without contacting either of the parts) and when it moves, the markings block the light and as a result, signals are generated by the detector's circuitry.

There are two types of encoders preferred for use in the claimed invention, each of which is well know in industry. The first is an incremental encoder containing a single section on the index plate with multiple demarcations of a known distance between. The output of this type of encoder is the movement speed (number of line counts per time unit) or the linear displacement relative to a known previous position.

The second major type of encoder is the absolute position encoder. In this type of encoder, the index plate consists of multiple sections, each section of which contains multiple demarcations so as to generate a digital word for every discrete position with a length equivalent to the number of sections (2 sections=2 bits etc.). The number of light source-detector sets and also the number of signal lines in this absolute encoder type is equal to the number of sections on the index plate. The output of this type of encoder is the absolute position of the encoder's plate relative to an absolute zero established during the system's assembly or calibration. The position is expressed as a digital word and the length of this word determines the system's precision. For example, a 10-bit word yields 1024 discrete positions. The precision in this case equals full stroke length divided by 1024.

Both types of encoders described above as transmissive devices, with a transparent index plate and opaque demarcations, but can be reflective index plates with the light source and detector positioned on the same side of a reflective index plate.

An alternative preferred embodiment incorporates an absolute-incremental encoder that requires only four I/O pins passing through the pressure housing for each encoder.

The use of absolute-incremental encoder is the proposed method for replacing the LVDT in cryocoolers with an optical encoder using a limited number of I/O pins in the hermetically sealed compressor unit.

The absolute-incremental encoder index plate consists of three sections on the same physical piece. One section has a number of markings with a known spacing between them that match the precision needed from the system (in the same way as in an incremental encoder). The other two sections have similar markings arranged in pairs, where the lines in each pair (one line in each section) have a smaller gap between them than the gap between the pairs. These two sections are used for direction of movement detection. During operation, receiving the signals from the two light detectors corresponding to these two sections in one order indicate one direction of movement and vice versa. The bigger gap between the pairs indicates to the system that a new pair is being read. Receiving a signal from the same detector twice without receiving a signal from the other detector indicate to the system a reversal in the direction of movement An "absolute position reset line" is marked across all three sections. The system resets to a known absolute position each time all three detectors transmit a simultaneous signal (all three signals received within a predetermined time frame). The actual reset takes into account the position of only one detector (the one that was used during the calibration process) to avoid ambiguity. The reset event is not required every cycle but because the system's accuracy improves with the number of resets, the absolute position reset line is located in the middle of the stroke.

The absolute-incremental system uses the direction of movement indication to either add or subtract the position increment to/from the absolute position obtained in the reset process. The side from the absolute position is also taken into account.

When the precision required by the system cannot be met by one incremental encoder section because the line width and spacing exceed the printing capabilities, more sections may be added with their markings shifted from one another to form a finer uniform division of the full motion stroke. Each such section adds one light source and detector. The signals from these additional sets are wired into the same signal line eliminating the need for additional signal lines and I/O pins.

The number of I/O pins required by the proposed system is three for each encoder, two for the direction detection and one for the incremental output. In addition, two I/O pins supply power to all the encoders in one cryocooler.

A single encoder design can be, rapidly adapted to work in different cooler designs by simply changing one component: an easily manufactured light-modulating grid. This passive element modulates light intensity seen at a detector such that motion steps can be accurately counted. The remaining elements of the sensor (light source, detectors, and electronics) are unaffected by changes in piston motion over the range of Stirling-class cooler designs planned for development over the next five to ten years.

SUMMARY OF THE INVENTION

The present invention is a cryocooler allowing the continuous position tracking of a cryocooler's compressor piston, displacer or other moving part using linear optical encoders. The invention generally includes a piston-compressor driven cryocooler incorporating a position sensor comprising a transmitter/receiver unit and an index plate. The position sensor is preferably comprised of a light emitter/detector for the transmission and receiving of an optical signal which is mounted on a fixed structure within a sealed volume in the cryocooler. The index plate is preferably a transparent, graduated position scale which is mounted on the moving component which component's position is desired. The index plate is mounted so as to allow its reading by the emitter/detector. During compressor operation, the signals from the detector are fed to electronic circuitry to allow the accurate determination of the location of a moving component in the system and to facilitate the control of that component through the use of appropriate control electronics.

It is a primary object of the invention to provide a cryocooler incorporating a piston position sensing system that provides ease of cryocooler manufacturing and producibility with the use of commercial of the shelf (COTS) parts compared to existing LVDT technology. It is another object of the invention to take advantage of the high degree of parts commonality in encoders designed for different piston stroke ranges reduces design cycle cost for new coolers and cooler variants. It is yet a further object of the invention to provide a cryocooler with a piston position sensor that is simple to install, reliable and accurate.

From the foregoing description, it will be apparent the cryocooler position sensor invention disclosed in this application will provide the significant functional benefits summarized in the introductory portion of the specification.

The words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a claim must be understood as being generic to all possible meanings supported by the specification and by the word itself.

DETAILED DESCRIPTION OF THE INVENTION

Figure 1:
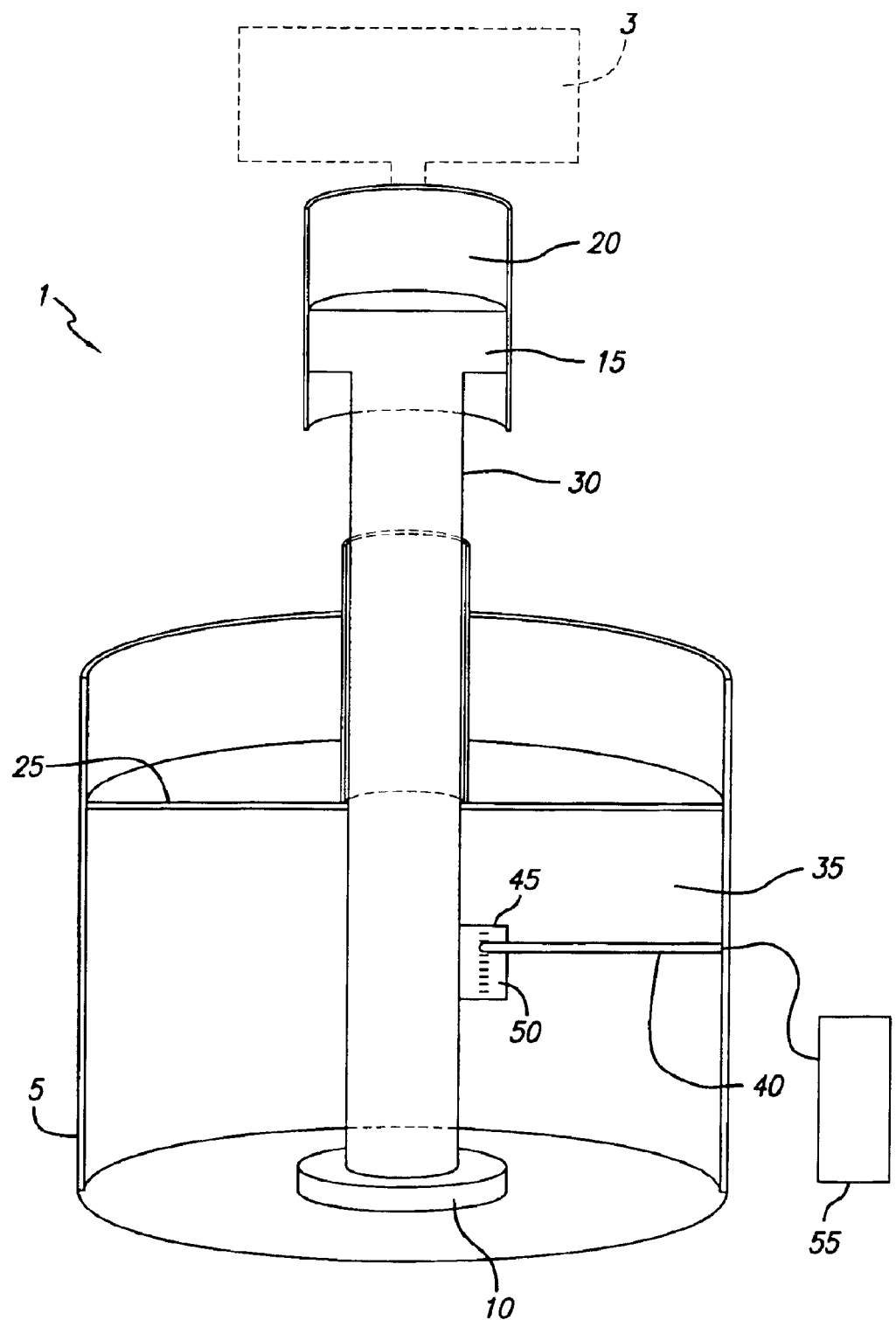
FIG. 1 shows a cross section of the compressor of the present invention with an optical encoder for piston position sensing mounted thereon.

Turning now to the figures wherein like elements are designated by like numerals among the several views, FIG.

1 shows a linear-type compressor 1 for use in a cryogenic refrigeration system 3. Cryogenic refrigeration system 3 may be a Stirling, Gifford-McMahon, Joule-Thomson or any system that requires the use of a compressor to compress a working fluid such as helium. Compressor 1 includes a housing 5 with an electronic voice coil 10 fixedly mounted thereon. Voice coil 10 is a moving electronic coil and may be comprised of copper wires wound about a static magnet much like the configuration of a conventional audio speaker coil assembly.

Compressor 1 further comprises at least one piston 15 slidably disposed within cylinder 20 for the compression of the working fluid in the volume of cylinder 20. Flexure bearing 25 is affixed to housing 5 so as to receive and be fixedly connected to piston 15 by use of a connecting member such as a rod 30. Flexure bearing 25 functions much like a helical spring, allowing linear motion of rod 30 and piston 15, while reducing or eliminating undesired motion in any other axis. The flexure bearing allows precision alignment of piston 15 along its desired longitudinal axis while maintaining radial rigidity with respect to undesired motion.

The similar use of a flexure bearing in cooperation with a compression piston in a cylinder has also been adapted for use of a cold head in a cryogenic refrigeration system to support the gas displacer element in the cold head.

In operation, an electronic signal is applied to voice coil 10, inducing an electromotive force on the coil so as to cause voice coil 10, rod 30 and piston 15 to move. When an oscillating signal, such as a sine wave is applied to voice coil 10, a comparable sinusoidal, oscillating motion is transferred to piston 15 within cylinder 20.

The stroke and frequency of oscillation of piston 15 within cylinder 20 may be modified by controlling the characteristics of the electronic drive signal to voice coil 10. In a preferred embodiment, voice coil 10 is driven by a sine wave at 50 Hz with amplitude sufficient to generate a nominal piston stroke within the cylinder of 2 cm.

Figure 2:
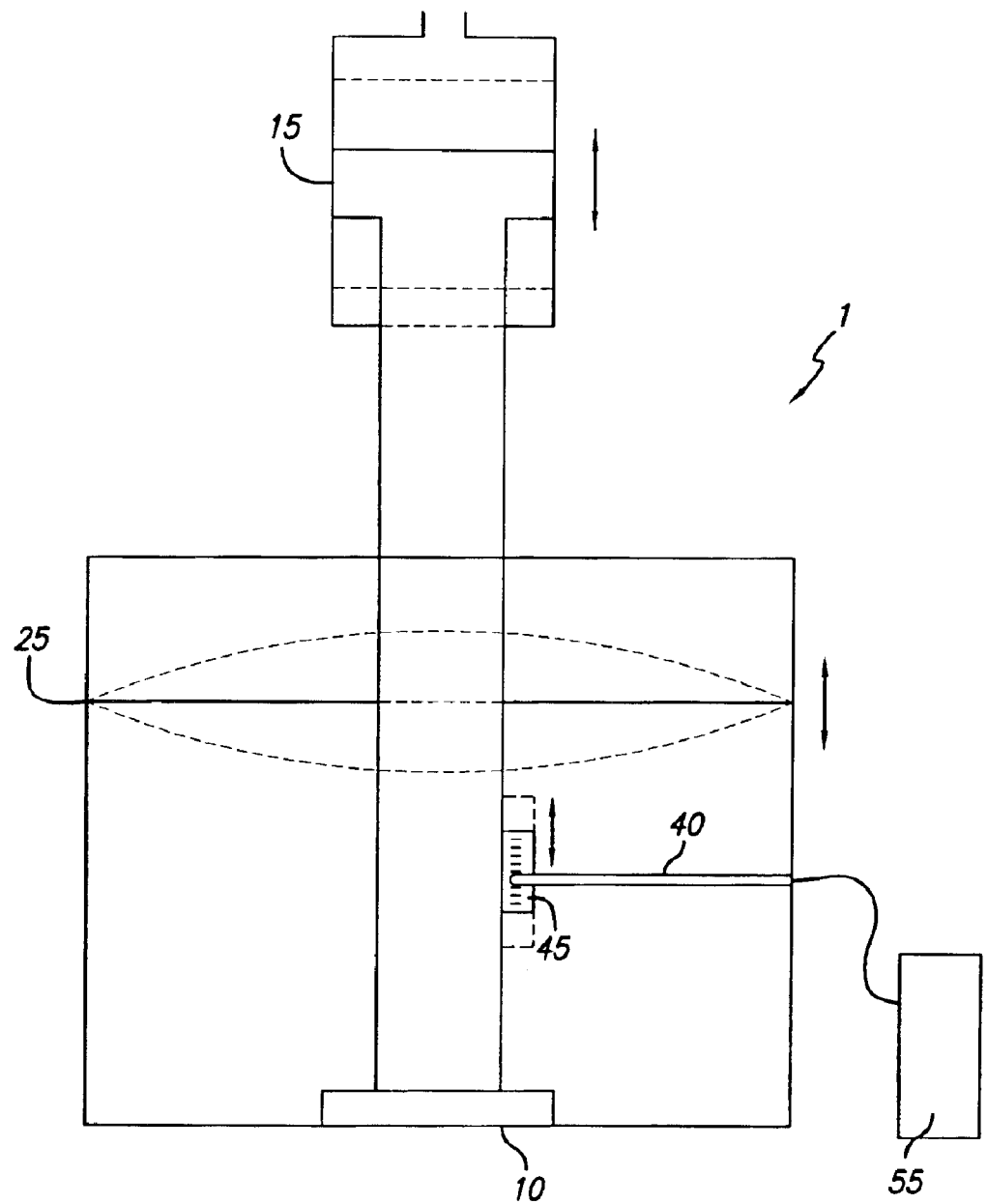
FIG. 2 illustrates the relative movement of the rod of the present invention and the maximum and minimum movement of the flexure bearing and piston.

FIG. 2 illustrates the linear movement of the flexure bearing and piston in the cylinder when driven by voice coil 10.

Alternative embodiments of compressors, not shown include the use of dual piston configurations as well as the use of balancing weights for the minimization of compressor vibration caused by a reciprocating piston or pistons.

FIG. 1 further shows housing 5 with encoder assembly 35 disposed thereon so as to allow precise position sensing of the piston 15 within cylinder 20. Encoder assembly 35 is preferably an optical encoder assembly readily commercially available from suppliers such as Gurley Precision Instruments and may be a linear incremental encoder, linear absolute encoder or any variation of encoder capable of sensing position with the desired accuracy.

A preferred embodiment of encoder assembly 35 includes an optical transmit/receive unit 40 and a transmissive or reflective index plate 45 with appropriate index markings 50. Index plate 45 is movably disposed with respect to transmit/receive unit 40 so that linear motion of 45 index plate with respect to transmit/receive unit 40 causes the markings on the index plate to interrupt the signal from transmit/receive unit 40. Transmit/receive unit 40 detects the interrupted signal and through appropriate control electronics 55, interprets the demarcations on index plate 45 and translates the signal into an index plate position along its path of travel with respect to transmit/receive unit 40.

A preferred embodiment mounts index plate 45 on rod 30 and transmit/receive unit 40 on housing 5. The signal is preferably routed exterior of the housing to control electronics 55 where is can be read to determine the stroke or frequency of the piston movement at any given instant in time.

The encoder may be of the incremental, absolute or relative absolute type, depending on the desired accuracy, cost considerations or design criteria of the cryogenic compressor or its application.

The type of encoder is preferably an absolute position encoder in which a plurality of dependent marking are read by the transmit/receive unit to determine the absolute position of the moving parts with a digital word of a certain size (such as 8 10 or 12 bits). A combination of an absolute encoder and the location of the receiving electronics external to the sealed volume creates the need for more signal pins in the hermetic connector that connects the internal encoder to the external uncontrolled environment Another option is using an incremental encoder and it will work in systems where the temperature can be controlled by knowing the relative movement of the moving parts (speed and acceleration of the controlled parts). This type of encoder requires by default a smaller number of pins.

Both types of encoders described above as transmissive devices (with a transparent marking element) can be reflective devices with the light source and sensor positioned on the same side of a mirror type marking element.

Although the description above relates to optical encoders, a system using different types of encoders (such as magnetic) utilizing the same principals can be implemented.

In cases where there is a need for absolute position reading and there is a limit on the number of sensors to be used, or on the size (usually width or diameter) of the encoder scale (the transparent part with the marking on it), or the number of signal lines between the encoder and electronic circuitry, the following approach is proposed:

This approach is valid for both linear and rotational encoders.

The encoder marking (either transmissive or reflective) consists of two sections on the same physical piece. One section shall have two markings in the case of a linear encoder and only one in a circular encoder. One of markings in the linear encoder, when mounted in the system, shall be positioned in a known absolute position and with the required accuracy (and so will the one marking in a circular encoder). The second marking in the linear encoder shall be marked on the other end of the motion stroke to indicate a reversal in direction of movement. The other section shall have a number of markings with a known spacing that matches the precision needed from the system. During operation, the system will reset to a known absolute position every cycle (either linear or 360 degree rotation.

A reciprocating rotational encoder with less than 360 degrees of rotation is for all practical purposes a linear encoder and during that cycle the absolute position shall be calculated by adding the readings from the relative portion of the encoder to that absolute position. In the case of a linear encoder, once the end of stroke marking is read, the system will subtract the readings instead of adding them. In this approach, an absolute reading can be made only after the absolute position mark is read for the first time after the system is started.

When the precision required by the system cannot be met by one relative encoder section because the line width and spacing exceed the printing capabilities, a second and more sections can be added with their markings shifted from one another to form a finer division of the full motion stroke. Each such section adds one set of light source and sensor. The signals from these additional sets can be wired into the same signal line eliminating the need for additional signal lines.

The preferred type of encoder in the present invention is an absolute position encoder. A conventional absolute encoder requires the number of signal lines between the detector and the electronic circuitry to be equal to the digital word's length, which is typically 10 or more bits. This approach presents a problem in cryocooler designs, where the number of position signal I/O lines passing through the cooler's pressure housing is physically limited to 4 or 5 per sensor, with two allocated to power supply. Cryocoolers have pressurized housings that must be hermetic to prevent leakage of the helium refrigerant gas. The electrical feedthrough must also be hermetic, leading to the use of feedthrough with relatively thick glass insulated pins. The large size of the pins and insulators plus the metal structure needed to support them limit the number of I/O pins available for motors and sensors within the housings.

This detection method is suitable for systems that allow both end markings to be read every cycle during operation (full stroke movement every cycle) or for rotational systems that rotate in one direction only.

If combined with a method for detecting the motion direction (or direction of rotation), the system shall be capable of detecting the position of moving parts that do not cover the full stroke every cycle (at the same time, the need for the end of stroke marking shall be eliminated). In such a case, even the absolute position marking reading is not mandatory every cycle and the reset to a known absolute position shall be made only in cycles that reach this marking's position.

Such a direction of motion detector can be (but not limited to) adding two sections and two sets of light sources and sensors to the marking element. The markings on these sections shall be made in pairs where one marking shall have a small shift with respect to the one on the other section. These pairs shall be repeatedly marked on these two sections with a gap between them that is different (bigger) than the shift within the pair. During operation, receiving the signals from the pair of sensors in one order shall indicate one direction of movement and vice versa. The bigger gap between the pairs shall indicate to the system that a new pair is being read.

Figure 3A:
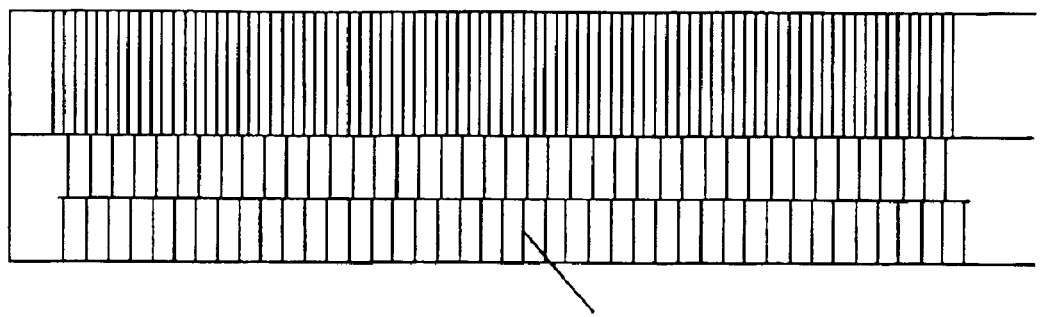
FIGS. 3a and 3b show examples of index markings for the index plate in a linear encoder for mounting on a moving part in a cryocooler compressor.
Figure 3B:
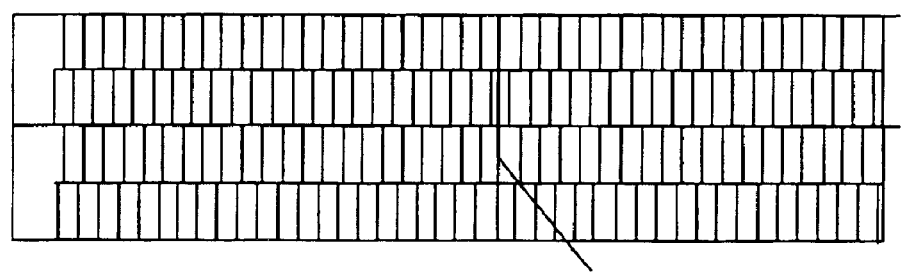

FIGS. 3a and 3b illustrate an example of a preferred embodiment of an index plate demarcation system for an absolute-incremental linear encoder with direction of motion detection and an absolute-incremental encoder with two incremental sections and a detection of movement detection, respectively.

Although the description above relates to optical encoders, different types of encoders (such as magnetic) utilizing the same principals can be implemented.

In application, index plate 45 is fixedly mounted to the moving part for which position sense data is desired such as piston 15 or rod 30. Index plate 45 may be mounted at any convenient location where there is sufficient clearance to allow it to travel along the maximum travel path of the part to be measured and so long as index plate 45 is mounted substantially parallel to the part's path of travel. Transmit/receive unit 40 is fixedly mounted to any convenient stationary location such as the interior of housing 5, and is disposed so as to received and read the linear position of index plate 45 throughout its path of travel. Necessary I/O wiring (no shown) connecting the transmit/receive unit to exterior control electronics may be routed as convenient and preferably incorporate a hermetic seal where the wiring exits the housing.

It should be noted that where it is desired to determine the position of other moving components in a cryogenic refrigeration system such as a displacer piston or balance weight or weights used to minimize vibration, the user may install the components of the encoder in the manner above, allowing precision position data of the component being observed.

From the foregoing description, it will be apparent that the device and method disclosed in this application will provide the significant functional benefits summarized in the introductory portion of the specification. The following claims are intended not only to cover the specific embodiments disclosed, but also to cover the inventive concepts explained herein with the maximum breadth and comprehensiveness permitted by the prior art.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

What is claimed is:

1. A cryogenic compressor comprising: a compressor having at least one moving part for compressing a gas; an encoder for continuous position tracking of said part, said encoder comprising at least one transmit/receive unit and at least one index plate, said at least one transmit/receive unit and said at least one of said index plates are oriented such that the movement of said part is transformed by said encoder into an electronic signal representing said part's position.

2. The cryogenic compressor as claimed in claim 1 wherein said encoder comprises analog to digital conversion circuitry and outputs digital position signals.

3. The cryogenic compressor as claimed in claim 1 wherein said encoder is of an absolute-incremental type, comprising a plurality of tracks marked on a scale, wherein said tracks are comprised of incremental and index tracks, wherein said incremental tracks are read by a read head to produce speed (or increments of motion per time unit) information of said part, wherein said index tracks are read by said read head to produce index signals representing pre-defined absolute position of said part whereby the combination of signals from said index and said incremental tracks produce absolute position information of said part at any point of said relative motion.

4. A cryogenic refrigerator having at least one reciprocating piston for displacing refrigeration gas and comprising a linear magnetic encoder for continuous position tracking of said at least one piston, wherein said encoder comprises a read head and a scale, wherein one of said read head or scale is stationary while the other is attached to said at least one piston to create relative motion between said read head and said scale, whereby said relative motion is transformed in by said encoder into signals representing said at least one piston's position.

* * * * *